O. J. PETRASCHKE & R. H. ZWICKEY.
SPRING LOCK AUTOMOBILE RIM.
APPLICATION FILED APR. 30, 1917.
1,287,420.
Patented Dec. 10, 1918.
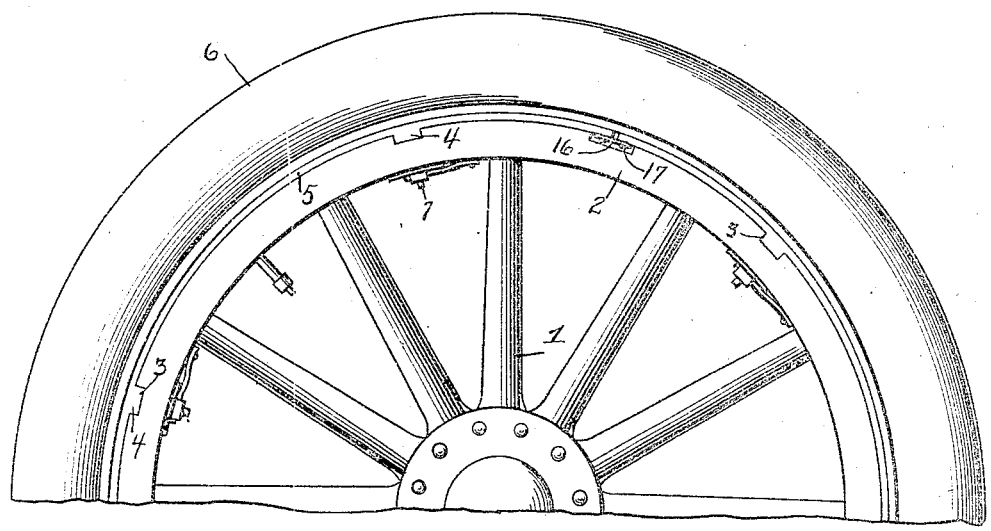
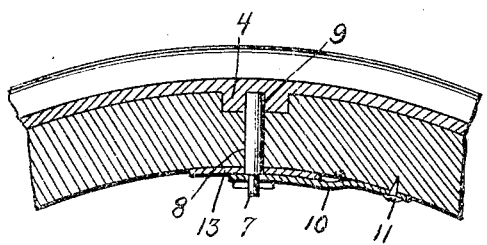
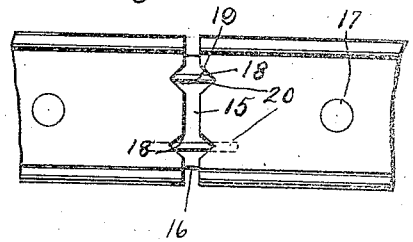
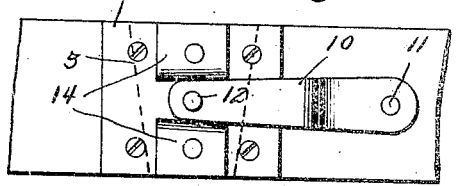
INVENTOR
Otto J. Petraschke.
Robert H. Zwickey
WITNESSES
Arthur K. Moo
L. B. Middleton
BY Richard Owen
ATTORNEY

UNITED STATES PATENT OFFICE.

OTTO J. PETRASCHKE AND ROBERT H. ZWICKEY, OF VERONA, WISCONSIN.

SPRING-LOCK AUTOMOBILE-RIM.

1,287,420.  Specification of Letters Patent.  Patented Dec. 10, 1918.

Application filed April 30, 1917. Serial No. 165,493.

*To all whom it may concern:*

Be it known that we, OTTO J. PETRASCHKE and ROBERT H. ZWICKEY, citizens of the United States, residing at Verona, in the county of Dane and State of Wisconsin, have invented certain new and useful Improvements in Spring-Lock Automobile-Rims, of which the following is a specification.

This invention relates to new and useful improvements in automobile wheels and the principal object of the invention is to provide means for quickly and easily securing the rim, carrying the tire on the wheel.

Another object of the invention is to provide means on the rim engaging with means on the felly for positioning the rim on the wheel.

Another object of the invention is to provide projections on the rim engaging slots in the felly and pins passing through holes in the felly and engaging with holes in the projections for holding the rim in place and spring means for holding the pins in the holes.

A further object of the invention is to provide means for securing the two ends of the rim together.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings, wherein like characters denote like or corresponding parts throughout the several views, and in which:

Figure 1 is an elevation of part of a wheel supplied with our invention.

Fig. 2 is a longitudinal, sectional view.

Figs. 3 and 4 are details.

In these figures, 1 indicates the wheel having its felly 2 provided with transverse slots 3 and these slots are to receive lugs 4 located on the under side of the demountable rim 5 which carries the tire 6. We prefer to make the slots 3 of wedge shape, as indicated in dotted lines in Fig. 4 and to make the lugs 4 of corresponding shape. 7 indicates pins passing through holes 8 in the felly into a hole 9 in the lug 4 and a spring plate 10 secured to the under side of the felly at 11 has a hole 12 for receiving the reduced end of the pin to hold the same in place. 13 indicates a metal plate secured to the under side of the felly adjacent the hole 8 and having a hole therein registering with said hole 8 and this plate carries a pair of lugs 14 for engaging the end of the spring plate 10 to hold the same in engagement with the pin. The space between these two lugs is smaller than the width of the spring so that the spring must be forced between the lugs so as to be held thereby.

We prefer to separate the rim as at 15 and we secure the two ends of said rim together by means of the latch 16 secured to one end of the rim engaging a pin 17 secured to the other end. The numeral 18 designates recesses formed in the abutting ends of the rim and 19 indicates pins carried by one end and engaging holes 20 in the other end.

After the tire is placed on the rim the ends of the same are locked together by means of the latch 16. The rim is then slid sidewise onto the wheel with the lugs 4 engaging the slots 3 and after the rim is in position the pins 7 are inserted and then the spring plates 10 are forced into position to hold the pins in place. Thus, the rim is securely held in place and cannot be removed from the wheel until the spring plates 10 are forced from between the lugs 14 by means of pliers or the like, after which the pins 7 are removed and then the rim may be slid sidewise off the wheel.

It is thought from the foregoing that the advantages and novel features of our invention will be readily apparent.

We desire it to be understood that we may make slight changes in the construction and in the combination and arrangement of the several parts, provided that such changes fall within the scope of the appended claims.

We claim as our invention:

1. An automobile wheel comprising a rim having lugs thereon, a felly having slots therein to receive the lugs, said lugs and felly having holes therein, pins passing through said holes, spring plates engaging said pins to hold the same in position and lugs on the felly engaging the spring plates to hold the same in engagement with the pins.

2. An automobile wheel comprising a rim having lugs thereon, a felly having slots therein to receive the lugs, said lugs and felly having holes therein, pins passing through said holes, lugs on said felly upon opposite sides of said pins, and spring plates each having an apertured end to engage said pins and being frictionally engaged between the pairs of the lugs for holding said pins in position.

In testimony whereof we affix or signatures in presence of two witnesses.

OTTO J. PETRASCHKE.
ROBERT H. ZWICKEY.

Witnesses:
 FRED L. GENTZ,
 PAUL BURGERSHE.